United States Patent
Park et al.

(10) Patent No.: US 6,780,663 B2
(45) Date of Patent: Aug. 24, 2004

(54) METHOD OF FORMING FLOATING STRUCTURE OF SUBSTRATE AND METHOD OF MANUFACTURING FLOATING STRUCTURE GATE ELECTRODE AND FIELD EMISSION DEVICE EMPLOYING THE FLOATING STRUCTURE

(75) Inventors: Young-Jun Park, Kyungki-do (KR); In-Taek Han, Seoul (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 161 days.

(21) Appl. No.: 10/238,780

(22) Filed: Sep. 11, 2002

(65) Prior Publication Data

US 2003/0113450 A1 Jun. 19, 2003

(30) Foreign Application Priority Data

Dec. 18, 2001 (KR) .................................. 2001-0080907

(51) Int. Cl.$^7$ ............................................. H01L 21/00
(52) U.S. Cl. .......................... 438/52; 438/411; 438/48; 438/20; 313/238; 313/260; 313/295; 313/310; 313/618
(58) Field of Search .............................. 438/20, 50–53, 438/411, 48; 313/238–266, 294–312, 618; 216/11

(56) References Cited

U.S. PATENT DOCUMENTS

| | | | |
|---|---|---|---|
| 5,358,909 A | * 10/1994 | Hashiguchi et al. | .......... 438/20 |
| 5,438,015 A | * 8/1995 | Lur | .............................. 438/407 |
| 5,543,346 A | 8/1996 | Keum et al. | |
| 5,727,977 A | * 3/1998 | Maracas et al. | ............... 445/24 |
| 5,731,597 A | * 3/1998 | Lee et al. | ...................... 257/10 |
| 5,885,124 A | 3/1999 | Hattori | |
| 5,973,444 A | 10/1999 | Xu et al. | |
| 6,137,213 A | 10/2000 | Moyer et al. | |
| 6,328,904 B1 | * 12/2001 | Hattori et al. | ................. 216/11 |
| 2001/0024084 A1 | * 9/2001 | Kajiwara | ..................... 313/486 |
| 2001/0024883 A1 | * 9/2001 | Huang et al. | ................ 438/695 |
| 2001/0026951 A1 | * 10/2001 | Vergani et al. | ................ 438/52 |

* cited by examiner

Primary Examiner—Matthew Smith
Assistant Examiner—Renzo Rocchegiani
(74) Attorney, Agent, or Firm—Burns, Doane, Swecker & Mathis, L.L.P.

(57) ABSTRACT

A method of forming a floating structure lifting up from a substrate and a method of manufacturing a field emission device (FED) employing the floating structure are provided. The method of forming a floating structure includes forming an expansion causer layer, which can generate a byproduct from the reacting with a predetermined reactant gas causing volume expansion, on the substrate; forming an object material layer for the floating structure on a resultant stack; forming a hole through which the reactant gas is supplied on a resultant stack; supplying the reactant gas through the hole so that the object material layer partially lifts up from the substrate due to the byproduct generated from the reaction of the expansion causer layer with the reactant gas; and removing the byproduct through the hole so that the portion of the object material layer lifting up from the substrate can be completely separated from the substrate to form the floating structure.

48 Claims, 22 Drawing Sheets ered through the gate hole. Then, an emitter, for example, a micro tip or a carbon nano tube (CNT), is formed on the bottom of the gate hole, i.e., on the exposed top surface of the cathode electrode.

METHOD OF FORMING FLOATING STRUCTURE OF SUBSTRATE AND METHOD OF MANUFACTURING FLOATING STRUCTURE GATE ELECTRODE AND FIELD EMISSION DEVICE EMPLOYING THE FLOATING STRUCTURE

Priority is claimed to Patent Application Number 2001-80907 filed in Republic of Korea on Dec. 18, 2001, herein incorporated by reference.

BACKGROUND OF THE INVENTION

1. Field of the Invention

The present invention relates to a method of forming a floating dome structure lifting up from the surface of a substrate and a method of manufacturing a field emission device (FED) employing the floating dome structure.

2. Description of the Related Art

Manufacturing field emission device includes a series of semiconductor processes, i.e., formation of a cathode electrode, formation of a gate insulation layer, and formation of a gate electrode. In addition, photolithography and dry or wet etching are performed on a substrate from the gate electrode to the top of the cathode electrode to form a gate hole so that the top of the cathode electrode below the gate electrode can be exposed through the gate hole. Then, an emitter, for example, a micro tip or a carbon nano tube (CNT), is formed on the bottom of the gate hole, i.e., on the exposed top surface of the cathode electrode.

FIGS. 1 and 2 are schematic sectional views of basic structures of general FEDs employing CNTs as electron emitters. FIG. 3 is a schematic sectional view of an FED employing micro tips as electron emitters, specifically provided with a vacuum bridge focusing structure, as disclosed in U.S. Pat. No. 6,137,213. For clarity of description, the same reference numerals denote the same elements having the same functions in FIGS. 1 through 3.

Referring to FIGS. 1 and 2, a cathode 2 is formed on the top of a substrate 1, and CNTs 3 are formed on the cathode 2. A gate insulation layer 5 and a gate electrode 6 are formed on the top of the substrate 1 to provide a gate hole (or a gate well 4 or 4'), in which the cathode 2 and the CNTs 3 are located. The gate hole 4 of FIG. 1 has the shape of a pot, and the gate hole 4' of FIG. 2 has a vertical cylindrical shape. This difference is caused by the type of etching method. The gate hole 4 of FIG. 1 is formed by a wet etching method, and the gate hole 4' of FIG. 2 is formed by a dry etching method.

In the above-mentioned structure, the thickness of the gate insulation layer 5 depends on the distance between the CNTs 3 and electrons emitted and moving away from the CNTs 3. The distance between the CNTs 3 and electrons must be over a predetermined distance in order to smoothly enable electrons to be emitted and smoothly control and accelerate the electrons. Accordingly, the gate insulation layer 5 must have a sufficient thickness to secure the distance mentioned above. However, a single layer has a limitation in thickness, and manufacturing costs increase in relation to the increase of the thickness.

To overcome these problems, the FED of FIG. 3 employing vacuum bridge focusing electrodes 7, in addition to the above-described elements, has been proposed. Since it is difficult to form electron emitters using CNTs, conventional micro tips 3' are used as electron emitters. Since formation of a photoresist layer, deposition of a metal layer, and patterning are required to form the focusing electrodes 7 in manufacturing the FED of FIG. 3, manufacturing is complicated and time consuming. A complicated structure as shown in FIG. 3 is vulnerable to residual stress of an internal structure and easily deforms. Moreover, it is difficult to manufacture uniform electrodes to have uniform potential in controlling a sub pixel, i.e., a group of multiple micro tips. (see U.S. Pat. Nos. 5,973,444 and 6,137,213)

SUMMARY OF THE INVENTION

To solve the above-described problems, it is an object of the present invention to provide a method of easily forming a floating dome structure, such as applying a focusing electrode to a field emission device, lifting up from a substrate and a method of manufacturing an FED employing the floating dome structure.

To achieve the object of the present invention, there is provided a method of forming a predetermined stack structure, which is formed on a substrate, into a floating structure. The method includes forming an expansion causer layer, which can generate a byproduct from the reacting with a predetermined reactant gas causing volume expansion, on the substrate; forming an object material layer for the floating structure on a resultant stack; forming a hole through which the reactant gas is supplied on a resultant stack; supplying the reactant gas through the hole so that the object material layer partially lifts up from the substrate due to the byproduct generated from the reaction of the expansion causer layer with the reactant gas; and removing the byproduct through the hole so that the portion of the object material layer lifting up from the substrate can be completely separated from the substrate to form the floating structure.

In other words, unlike conventional methods of forming a sacrificial layer having a thickness corresponding to the height of a floating structure and forming a floating structure to have a desired shape at an initial stage, the present invention employs a technique of simply depositing a material layer or layers and allowing the material layer or layers to be transformed to have a desired shape by the generation and expansion of an outgrowth from an underlying layer so that various types of inventions can be derived from the present invention.

Accordingly, to achieve the object of the present invention, in one embodiment, there is provided a method of forming a dome-shaped structure lifting up from a substrate. The method includes forming a metal catalytic layer on the substrate; forming an amorphous material on the metal catalytic layer, the amorphous material having an opening portion that partially exposes the metal catalytic layer; supplying hydrogen gas and carbon oxide gas through the opening portion while heating the substrate so that a carbon layer grows between the amorphous material and the metal catalytic layer surrounding the opening portion to form a predetermined carbon layer and force the amorphous material to lift up from the substrate; and removing the carbon layer through the opening portion so that the amorphous material around the opening portion is partially separated from and floats over the substrate.

Preferably, the metal catalytic layer is a Ni—Fe—Co alloy, and the amorphous material is amorphous silicon.

Preferably, the catalytic metal layer is formed by a deposition method, and the amorphous material layer or amorphous silicon layer is formed by a chemical vapor deposition (CVD) method. In addition, it is preferable that the carbon oxide and the hydrogen gas are supplied during a CVD process.

In another embodiment, there is provided a method of manufacturing a gate electrode having a floating structure lifting up from a substrate in a field emission device. The method includes forming a cathode on the substrate; forming a catalytic metal layer on the top of the cathode; forming an amorphous material layer having a predetermined thickness on a resultant stack; forming a gate electrode on the top of the amorphous material layer; vertically forming a hole in a resultant stack to partially expose the surface of one of the catalytic metal layer and the cathode; supplying hydrogen gas and carbon oxide gas through the hole while heating the substrate so that a carbon layer is grown between the amorphous material layer and its underlying stack around the hole and forces the amorphous material layer to lift up from the substrate; and removing the carbon layer through the hole so that the amorphous material layer and the gate electrode around the hole are partially separated from and float over the substrate.

Preferably, the method also includes forming an insulation layer on the cathode to a predetermined thickness before the step of forming the catalytic metal layer. The insulation layer includes an opening portion which corresponds to the hole, and more preferably, is coaxial with the hole.

In still another embodiment, there is provided a method of manufacturing a gate electrode having a floating structure lifting up from a substrate in a field emission device. The method includes forming a cathode on the substrate; forming a gate insulation layer on the cathode to a predetermined thickness; forming a gate electrode on the gate insulation layer; forming an upper insulation layer having an opening portion on the gate electrode to a predetermined thickness; forming a catalytic layer on the top of the gate electrode exposed at the bottom of the opening portion of the upper insulation layer; forming an amorphous material layer on a resultant stack to a predetermined thickness; forming a second gate electrode on the amorphous material layer; forming a hole corresponding to the opening portion from the top of the second gage electrode to directly below exposing the surface of either the catalytic layer or the cathode; supplying hydrogen gas and carbon oxide gas through the hole while heating the substrate so that a carbon layer is grown between the amorphous material layer and its underlying stack surrounding the hole and forces the amorphous material layer to lift up from the substrate; and removing the carbon layer through the hole so that the amorphous material layer and the second gate electrode around the hole are partially separated from and float over the substrate.

In still another embodiment, there is provided a method of manufacturing an FED including a gate electrode having a floating structure. The method includes the steps of forming a cathode on a substrate; forming a gate insulation layer on the cathode to a predetermined thickness; forming a gate electrode on the gate insulation layer; forming an upper insulation layer having an opening portion on the gate electrode to a predetermined thickness; forming a catalytic layer on the top of the gate electrode exposed at the bottom of the opening portion of the upper gate insulation layer; forming an amorphous material layer on a resultant stack to a predetermined thickness; forming a second gate electrode on the amorphous material layer; forming a hole corresponding to the opening portion from directly below to the top of the second gage electrode and expose the surface of one of the catalytic layer and the cathode; supplying hydrogen gas and carbon dioxide gas through the hole while heating the substrate so that a carbon layer grows between the amorphous material layer and its underlying stack around the hole and makes it so that the amorphous material layer lifts up from the substrate; removing the carbon layer through the hole so that the amorphous material layer and the second gate electrode around the hole are partially separated from and float over the substrate; supplying a photoresist into the hole and on the second gate electrode to fill the hole with the photoresist and form a photoresist film on the second gate electrode to a predetermined thickness; removing the photoresist from the hole; growing a catalytic material on the top portion of the cathode, which is exposed at the bottom of the hole, to form a catalytic layer for growing carbon nano tubes (CNTs); depositing a CNT component material on the entire surface of a resultant stack to form a CNT array on the catalytic layer at the bottom of the hole; and removing the photoresist from a portion around the hole in a resultant stack and from the second gate electrode so that unnecessary components including the catalytic material are removed.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE INVENTION

Hereinafter, preferred embodiments of the present invention will be described in detail with reference to the attached drawings. General technology or methods widely known in the art of the present invention will not be described thoroughly.

Basically, in the present invention, an amorphous material layer is provided below an object layer to be a floating structure lifting up from a substrate, a catalytic layer is provided below the amorphous material layer, and a hole is formed extending to the catalytic layer. In this state, the present invention includes supplying carbon oxide gas and hydrogen gas to form a floating structure. The object layer lifts up from the substrate since byproducts from reaction between the supplied gases and the amorphous material layer and/or catalytic layer are accumulated and extend below the object layer, thereby enabling the floating structure to be formed. The comprehensive conception of the present invention briefly mentioned above will be described in detail with reference to FIGS. 4A through 4D.

Figure 1:
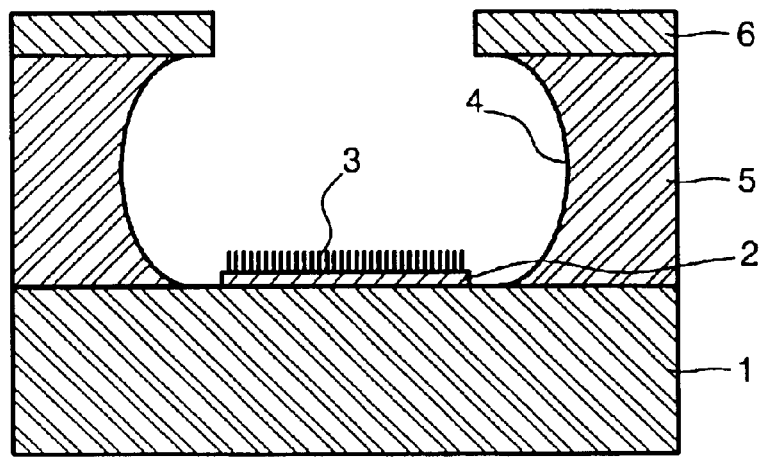
FIG. 1 is a schematic sectional view of a basic structure of one general field emission device (FED) employing a carbon nano tube (CNT) as an electron emitter.
Figure 2:
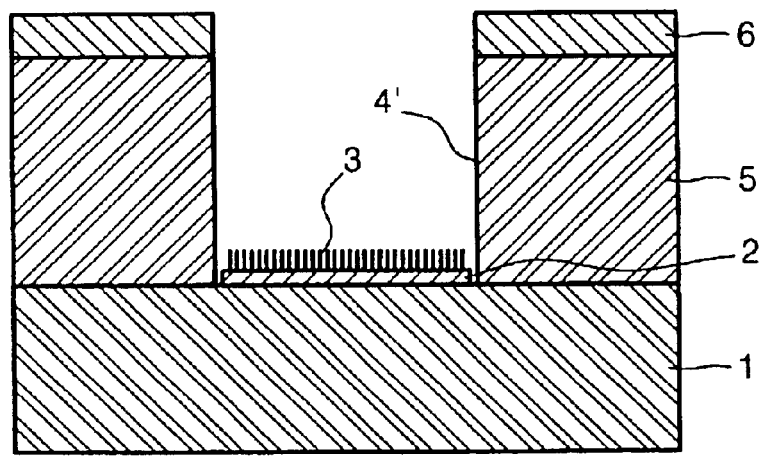
FIG. 2 is a schematic sectional view of a basic structure of another general FED employing a CNT as an electron emitter.
Figure 3:
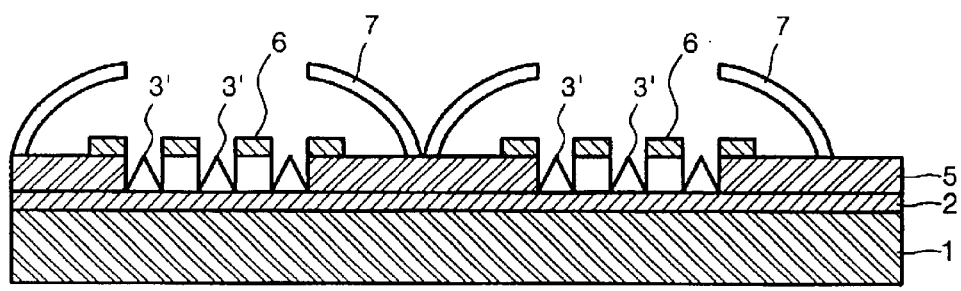
FIG. 3 is a schematic sectional view of an FED employing micro tips as electron emitters, specifically provided with a vacuum bridge focusing structure, as disclosed in U.S. Pat. No. 6,137,213.
Figure 4A:
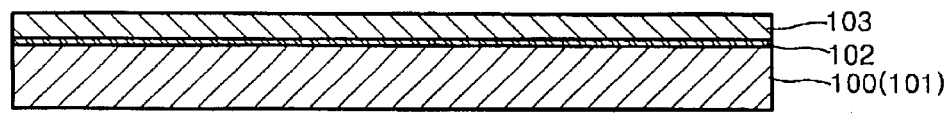
FIGS. 4A through 4D are sectional views for explaining the basic conception of the present invention.
Figure 4B:
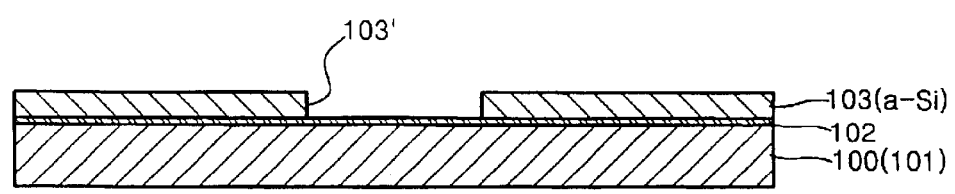
Figure 4C:
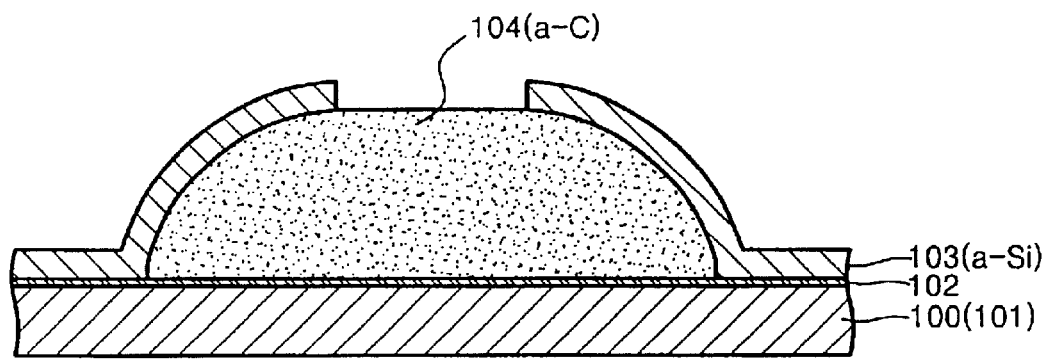
Figure 4D:
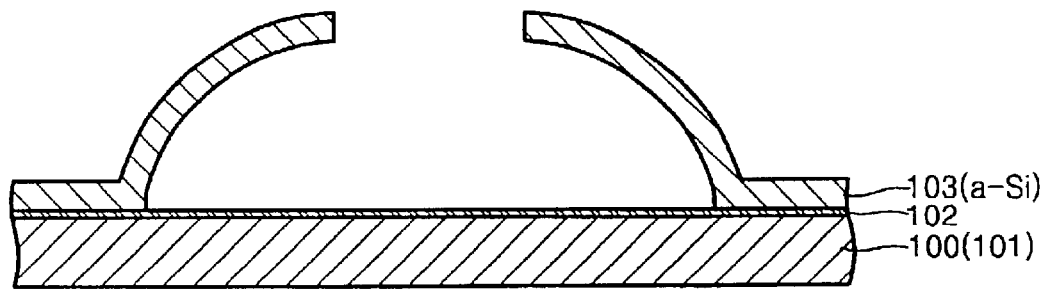

In forming a floating structure using a predetermined stack of layers formed on a substrate, as shown in FIG. 4A, a catalytic layer 102 is formed on a base stack 100, for example, a cathode 101 of Cr in a field emission device (FED). Here, the base stack 100 is not particularly significant but can be noted as any kind of stack or structure that can support a floating structure. Preferably, the catalytic layer 102 is formed of a metal, for example, an alloy of Fe—Ni—Co referred to as an invar, containing at least one metal among Ni, Fe, and Cr. An amorphous material layer 103, for example, an amorphous silicon (a-Si) layer, is formed on the catalytic layer 102. Here, the catalytic layer 102 and the amorphous material layer 103 act as an expansion causer layer causing volume to increase in the present invention. As described above, the expansion causer layer reacts to a predetermined reactant gas, for example, a mixture of hot carbon oxide gas, more specifically, carbon monoxide gas, and hydrogen gas, which are supplied at a predetermined ratio, thereby generating a byproduct, for example, amorphous carbon (a-C). In order to effectively generate a-C, a process of raising the temperature to a predetermined level, maintaining the temperature at the predetermined level for a predetermined period, and dropping the temperature is performed. Generation of a-C causes an object layer, which will be a floating structure having a predetermined shape described later, to lift up from a substrate. In other words, after a hole or well 103' is formed through the amorphous material layer 103 to the top of the catalytic layer 102 or the base stack 100, as shown in FIG. 4B, if a mixture of carbon monoxide gas and hydrogen gas is supplied, a byproduct, i.e., a-C, is generated and accumulated and expands below the amorphous material layer 103 of a-Si, as shown in FIG. 4C. Accordingly, the a-Si is transformed to have a dome shape, and if the a-C is removed, as shown in FIG. 4D, the a-Si becomes so that it floats above the base stack 100. The a-C can be removed by oxidizing the a-C into a gas such as $CO_2$ with the supply of hot hydrogen or oxygen plasma. As well, the a-C may be removed by a high-temperature calcination process.

Figure 5A:
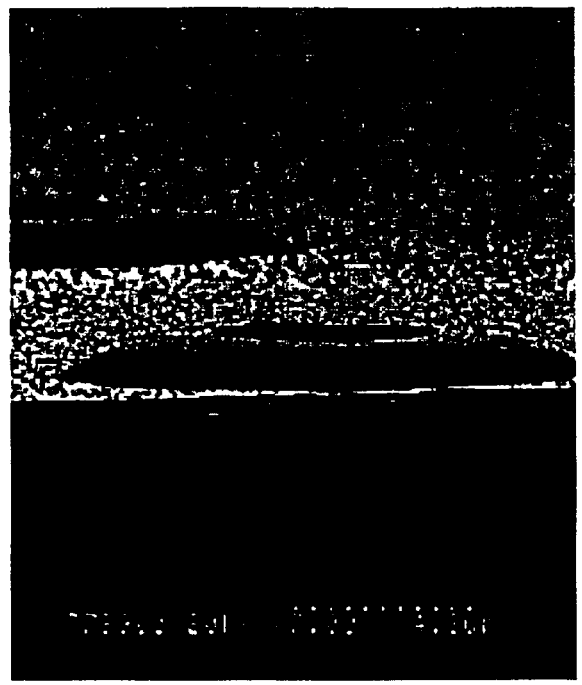
FIG. 5A is an SEM photograph of the exterior of a dome structure formed by forming amorphous carbon (a-C) in the stage shown in FIG. 4C according to the present invention.
Figure 5B:
FIG. 5B is an SEM photograph of the interior of the dome structure of FIG. 5A, in which a byproduct of a-C is generated and accumulated.

FIG. 5A is an SEM photograph of the exterior of a dome structure formed by forming a-C in the stage shown in FIG. 4C according to the present invention. FIG. 5B is an SEM photograph of the interior of the dome structure of FIG. 5A, in which a byproduct of a-C is generated and accumulated.

Figure 6A:
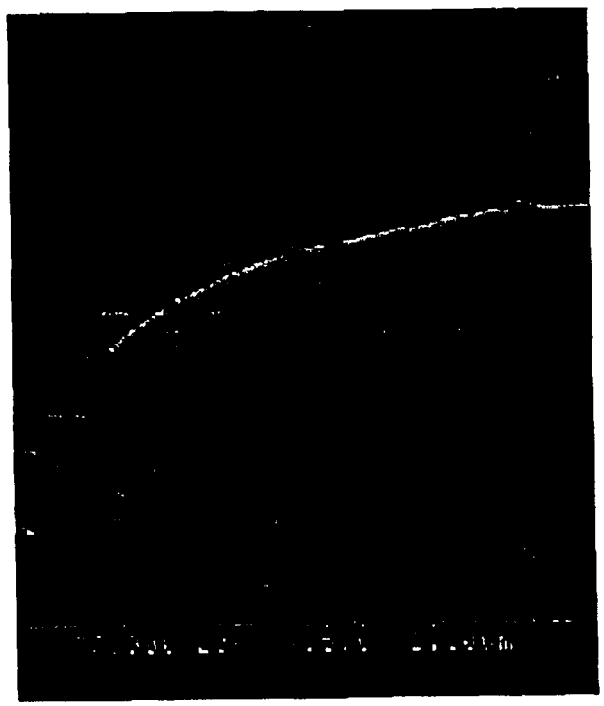
FIG. 6A is an SEM photograph of the exterior of a dome structure, from which a-C is removed in the stage shown in FIG. 4D, i.e., oxygen plasma, according to the present invention.
Figure 6B:
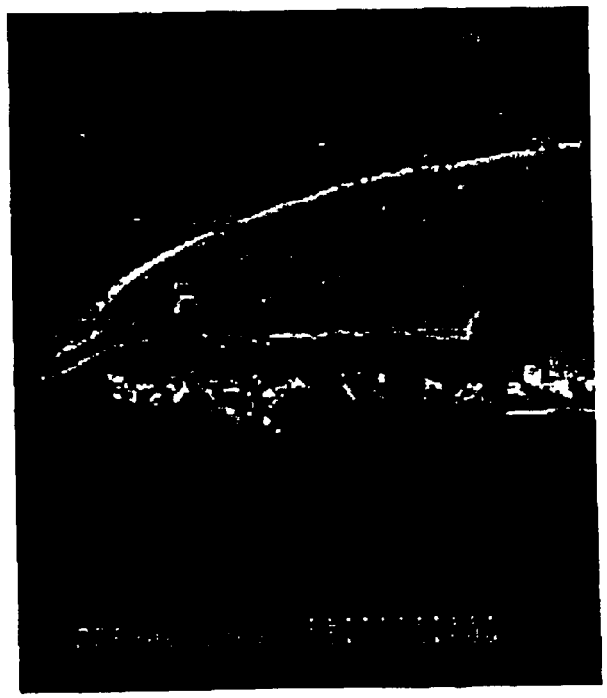
FIG. 6B is an SEM photograph of the interior of the dome structure of FIG. 6A from which a-C is removed.

FIG. 6A is an SEM photograph of the exterior of a dome structure from which the a-C is removed by performing the stage shown FIG. 4D, i.e., by supplying oxygen gas, according to the present invention. FIG. 6B is an SEM photograph of the interior of the dome structure of FIG. 6A, from which the a-C is removed. As shown in FIG. 6B, there is a-C remaining at the bottom of the dome structure. The amount of the remaining a-C needs to be controlled so that it does not exceed a limit allowed in a desired device.

Such a method of forming a floating structure can be applied to a variety of fields. For example, the method can be applied to the formation of a gate electrode, which needs to be separated from an electron emitter by a predetermined distance in an FED, or a three-dimensional structure, e.g., a moving electrode or contact of an RF switch, formed by a micro electromechanical system (MEMS) at a wafer level. The above-described comprehensive method of the present invention is not restricted to a specific field but can be applied to every field requiring such a floating structure.

FIGS. 7A through 7H are sectional views of the stages in the process of manufacturing an FED having a gate electrode of a floating structure according to a first embodiment of the present invention. For convenience sake, a substrate supporting a base stack 100 or a cathode 101 is omitted. As is well known, the substrate may be formed of glass or quartz.

Figure 7A:
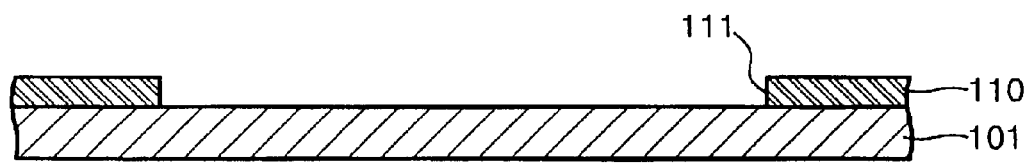
FIGS. 7A through 7H are sectional views of the stages in the process of forming a floating structure lifting up from a substrate and an FED according to a first embodiment of the present invention.

As shown in FIG. 7A, a gate insulation layer 110 of $SiO_2$ having an opening portion 111 is formed on the cathode 101. Formation of the gate insulation layer 110 includes deposition of $SiO_2$ using chemical vapor deposition (CVD), photolithography for forming a mask such as a photoresist, and etching for performing patterning using the mask.

Figure 7B:
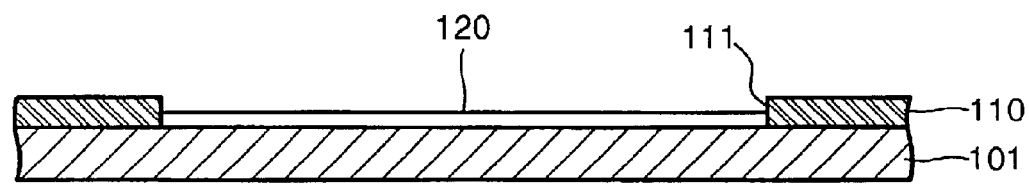

As shown in FIG. 7B, a catalytic layer 120 is formed on the bottom of the opening portion 111 of the gate insulation layer 110. The catalytic layer 120 is formed only on the bottom of the opening portion 111, i.e., the exposed surface of the cathode 101, by performing a lift-off process using a mask layer used during the formation of the gate insulation layer 110.

Figure 7C:
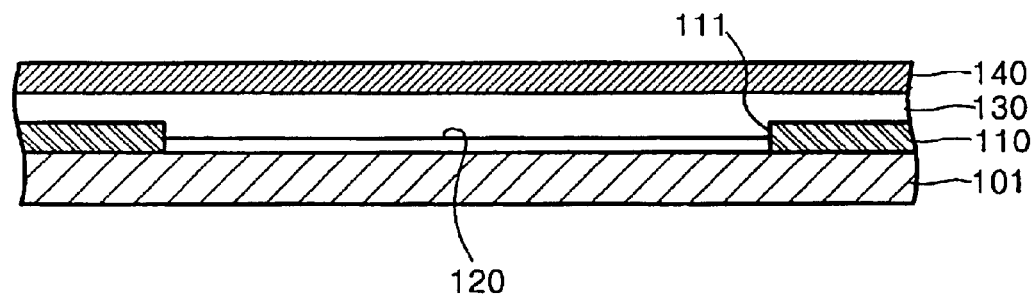

As shown in FIG. 7C, amorphous silicon (a-Si) 130 and a gate electrode 140 are sequentially deposited on the stack of FIG. 7B. The amorphous silicon 130 may be deposited by a CVD method, and the gate electrode 140 may be formed by a sputtering method using Al and Cr or an electron beam deposition method. It is apparent that the gate electrode 140 is patterned in accordance with a design required for an FED. Thus, a description of patterning will be omitted.

Figure 7D:
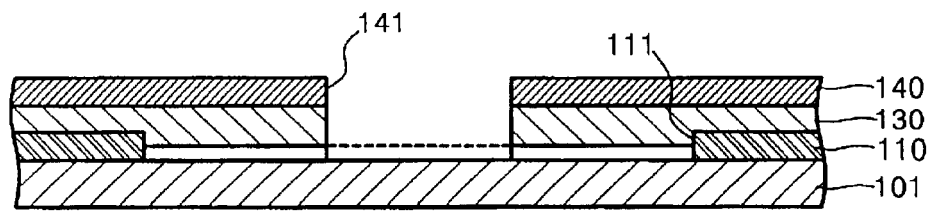

As shown in FIG. 7D, a hole or well 141 is formed through the gate electrode 140 to the surface of the cathode 101. According to circumstances, the hole or well 141 may be formed to stop on the top of the catalytic layer 110. In FIG. 7D, a dotted line in a lower portion of the hole 141 indicates that the catalytic layer 120 may remain without being completely removed.

Figure 7E:
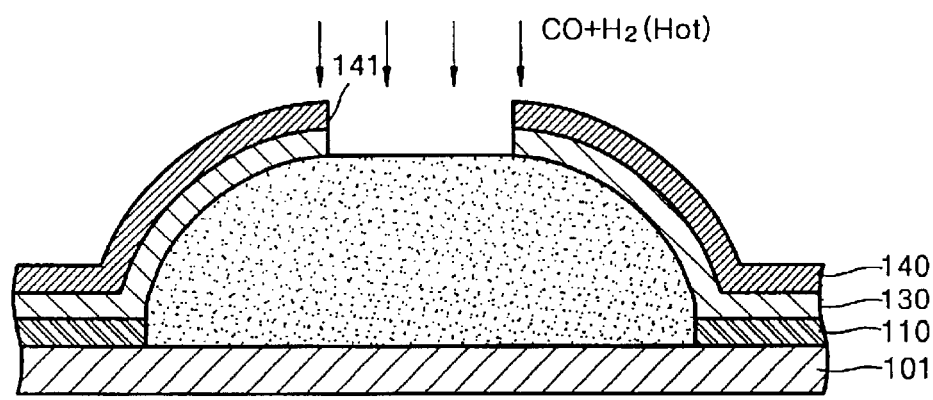

FIG. 7E shows volume expansion due to the generation of a byproduct, i.e., a-C, from the catalytic layer 120 and the amorphous silicon 130. As shown in FIG. 7E, when a mixture of hot carbon monoxide and hydrogen gases is supplied from above the hole 141 by, for example, a CVD apparatus, the catalytic layer 120 and the amorphous silicon 130, which are exposed through the hole 141, react to the mixture of the gases so that a byproduct, a-C, is generated and accumulated under the amorphous silicon 130. As a result, the amorphous silicon 130 and the gate electrode 140 are transformed into the shape of a dome.

Figure 7F:
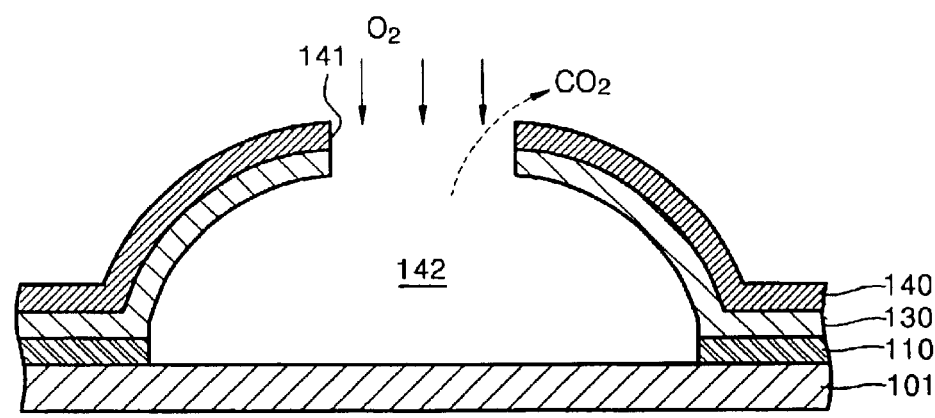

Next, as shown in FIG. 7F, if $H_2$ or $O_2$ plasma is supplied through the hole 141, the a-C accumulated below the amorphous silicon 130 is decomposed and removed. As a result, the amorphous silicon 130 and the gate electrode 140 lift up and float above the cathode 101, thereby forming a dome-shaped cavity 142. Here, as described above, the a-C may remain on the bottom of the dome-shaped cavity 142, but the amount of the remaining a-C must be appropriately controlled.

The process described up to now is an embodiment of a method of forming a gate electrode having a floating structure in an FED according to the present invention. The following description concerns an embodiment of a method of manufacturing an FED including a gate electrode having a floating structure formed through the above process.

Figure 7G:
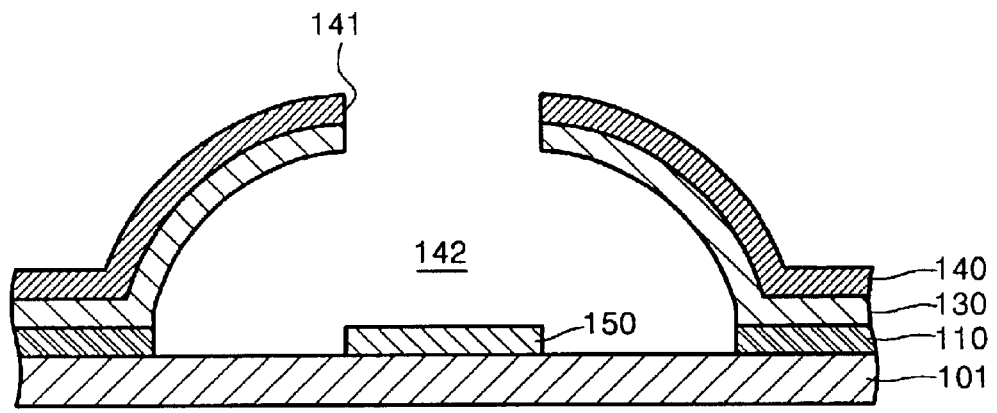

As shown in FIG. 7G, a catalytic layer 150 for deposition of a carbon nano tube (CNT) is formed on the bottom of the dome-shaped cavity 142, which is also the top of the cathode 101. The catalytic layer 150 may be formed by a lift-off method using a general photoresist.

Figure 7H:
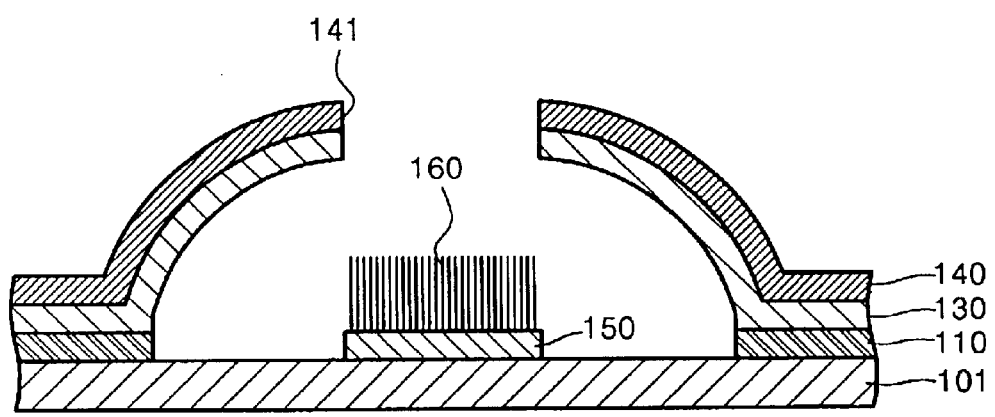

As shown in FIG. 7H, CNTs 160 are formed on the catalytic layer 150 by a typical method, for example, a direct current plasma enhanced chemical vapor deposition (DCPECVD) method, thereby completing a desired triode FED.

Figure 8:
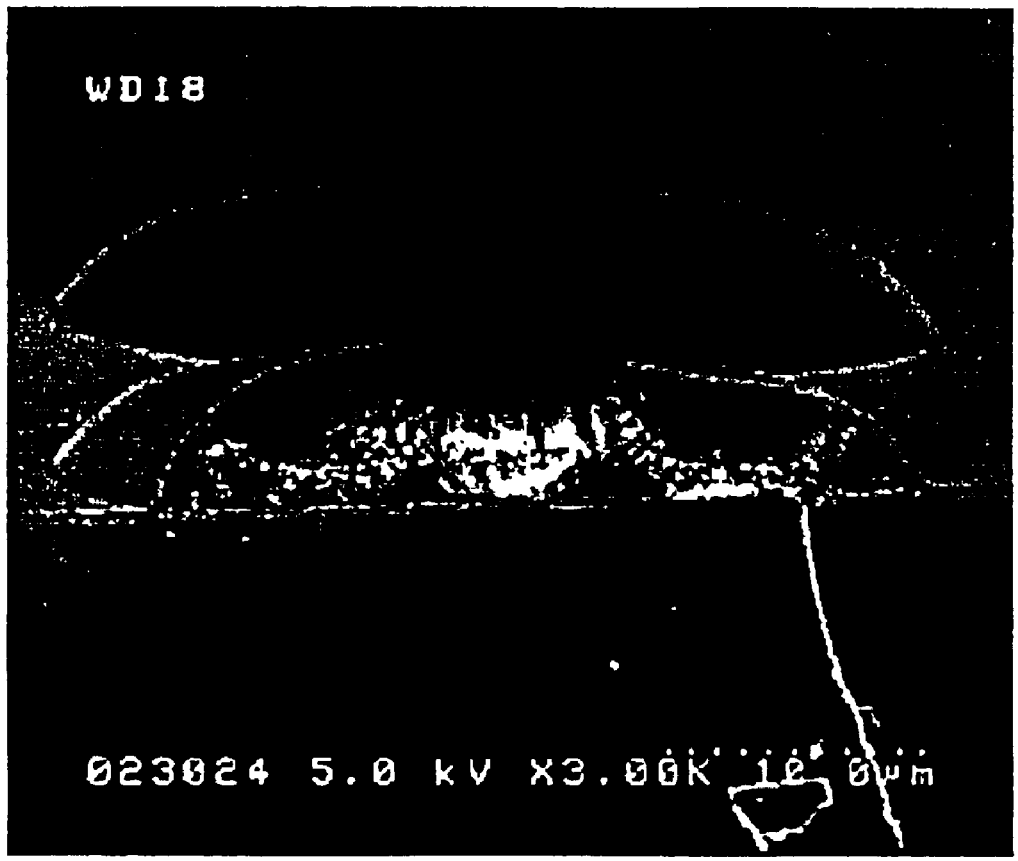
FIG. 8 is an SEM photograph of a state, in which CNTs are formed under a gate electrode of a dome structure after the stage shown in FIG. 7H is performed, according to the present invention.

FIG. 8 is an SEM photograph of a state, in which CNTs are formed under a dome-shaped gate electrode, after the stage shown in FIG. 7H is performed. Referring to FIG. 8, a sufficient amount of CNTs have been grown, and a-C remains around the CNTs.

Figure 9A:
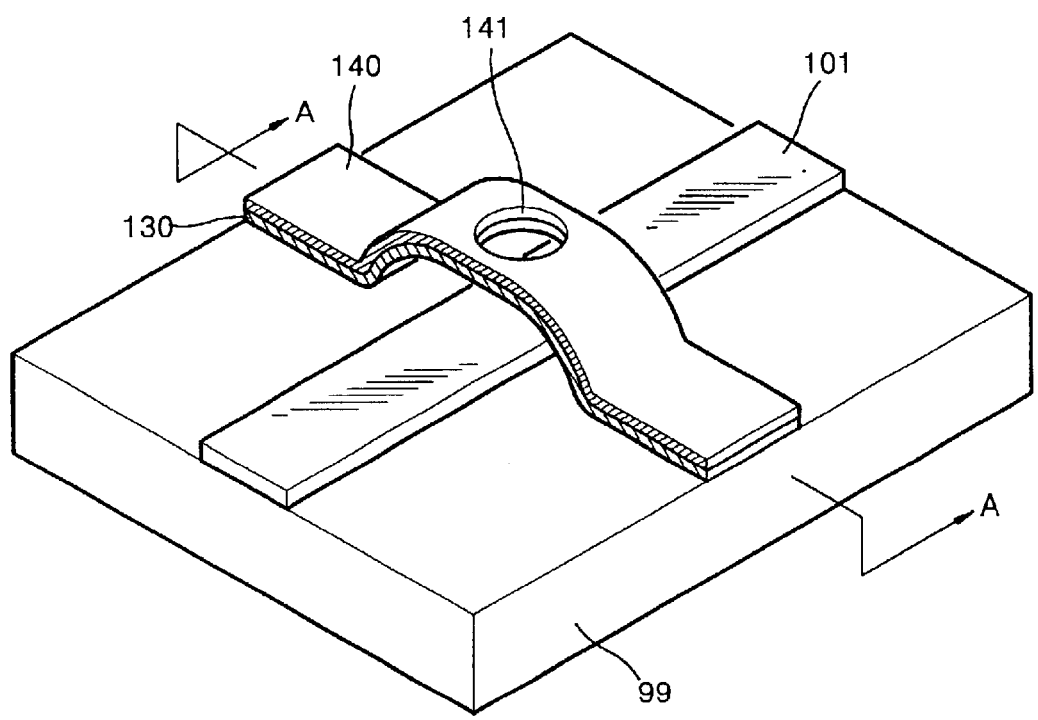
FIG. 9A is a schematic perspective view of a triode FED manufactured according to the present invention.
Figure 9B:
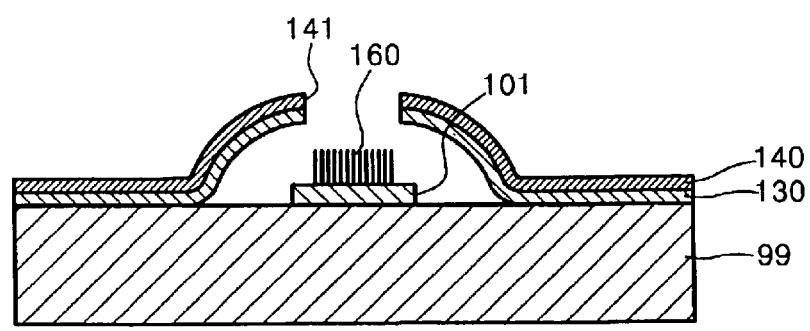
FIG. 9B is a schematic sectional view of the FED shown in FIG. 9A.

FIG. 9A is a perspective view of an FED, in which a part other than a dome-shaped part of a gate electrode is disposed on the same level as a cathode, without having a gate insulation layer. FIG. 9B is a sectional view of the FED of FIG. 9A, taken along the line A—A. The above FED is manufactured by a process, which will be described with reference to FIGS. 10A through 10E.

Referring to FIGS. 9A and 9B, a cathode 101 extends in one direction on a substrate 99, and a gate electrode 140 extends in a direction crossing the cathode 101. Normally, a plurality of cathodes and a plurality of gate electrodes, which are perpendicular to the cathodes, are disposed in a grid pattern. FIGS. 9A and 9B illustrate a structure for only a single triode. The cathode 101 and the gate electrode 140 are disposed on the same plane, and the gate electrode 140, at the portion crossing the cathode 101, is formed so as not to be touching the cathode 101 in the shape of an arch or a bridge. A gate or gate hole 141 is formed through the gate electrode 140 at the portion crossing the cathode 101, and CNTs 160 are provided as electron emitters below the gate hole 141. Amorphous silicon 130 used for the generation and accumulation of a-C is provided below the gate electrode 140 to transform the shape of the gate electrode 140.

Hereinafter, a process of manufacturing the FED shown in FIGS. 9A and 9B according to the present invention will be described. In FIGS. 10A through 10E, structures for only a single triode are illustrated.

Figure 10A:
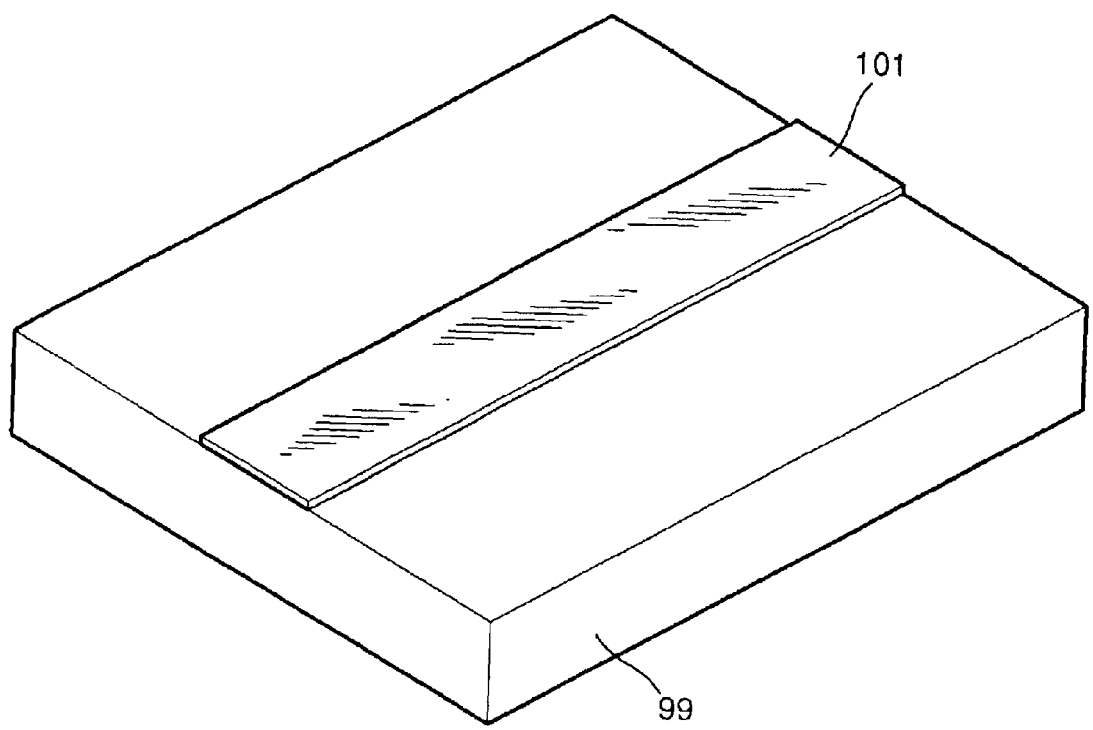
FIGS. 10A through 10F are views of the stages in the process of forming a floating gate electrode lifting up from a substrate and an FED according to a second embodiment of the present invention.

As shown in FIG. 10A, a strip of a cathode 101 is formed on a substrate 99. Here, the deposition of a cathode material and patterning of the deposited cathode material are performed.

Figure 10B:
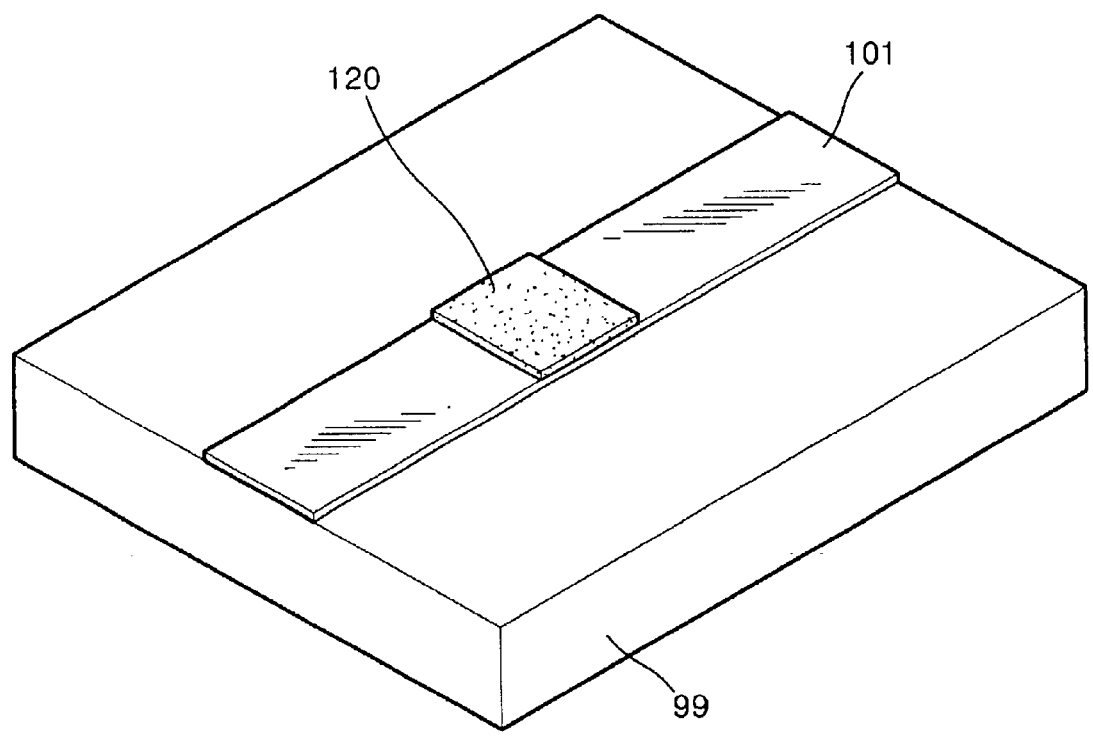

As shown in FIG. 10B, a catalytic layer 120 is formed on the cathode 101. Here, the blanket deposition of a catalytic material and patterning are performed so that the catalytic material is placed only on a part of the cathode 101.

Figure 10C:
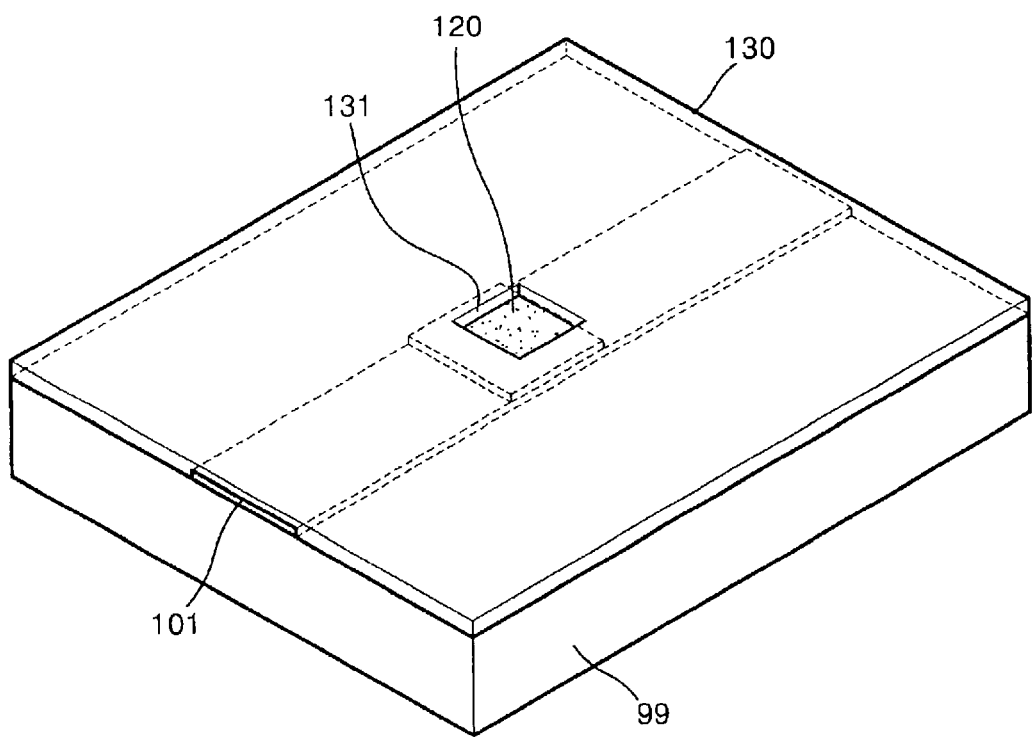

As shown in FIG. 10C, amorphous silicon 130 is deposited on the entire surface of the substrate 99 and is then patterned to form an opening portion 131, which exposes the catalytic layer 120. The opening portion 131 preferably has a rectangular shape but may have other shapes according to the circumstances. A metal layer (not shown) for a gate electrode (not shown) is formed on the amorphous silicon 130, and an opening portion (not shown), which exposes the catalytic layer 120, is also formed.

Figure 10D:
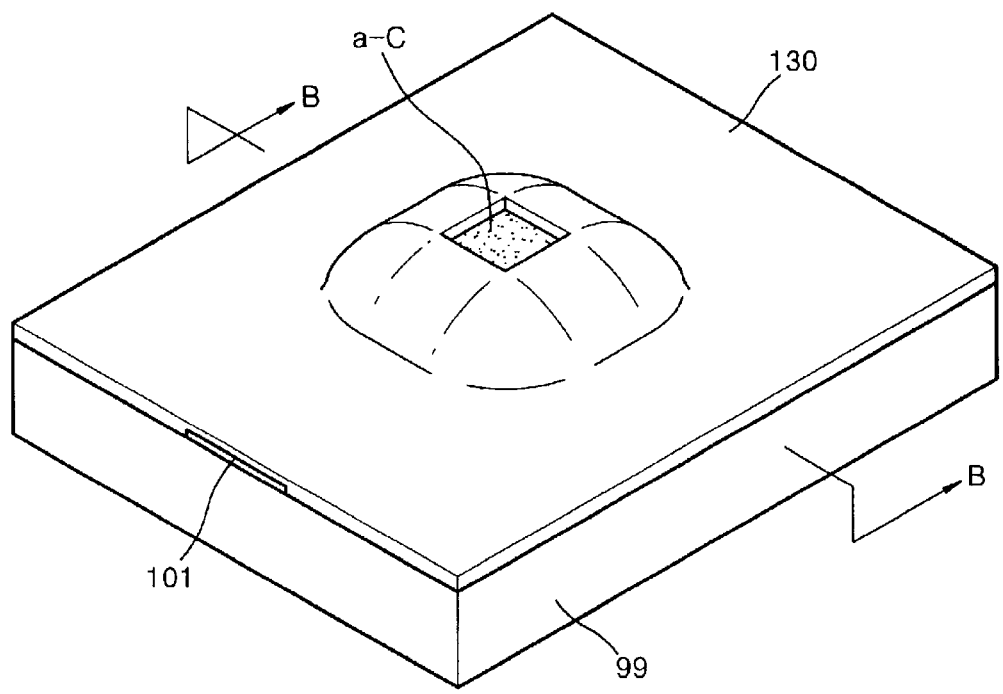
Figure 10E:
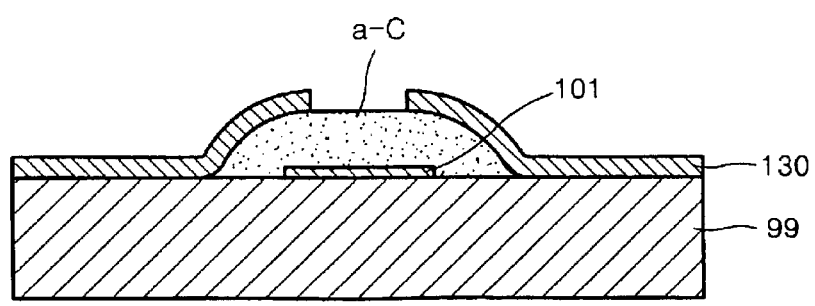

As shown in FIG. 10D, a mixture of high-temperature $H_2$ and CO gases is supplied by, for example, a CVD apparatus to allow a-C to be generated and accumulated by the process described above. As a result, the amorphous silicon 130 is transformed to have a dome shape. FIG. 10E shows a sectional view of the structure of FIG. 10D, taken along the line B—B.

Figure 10F:
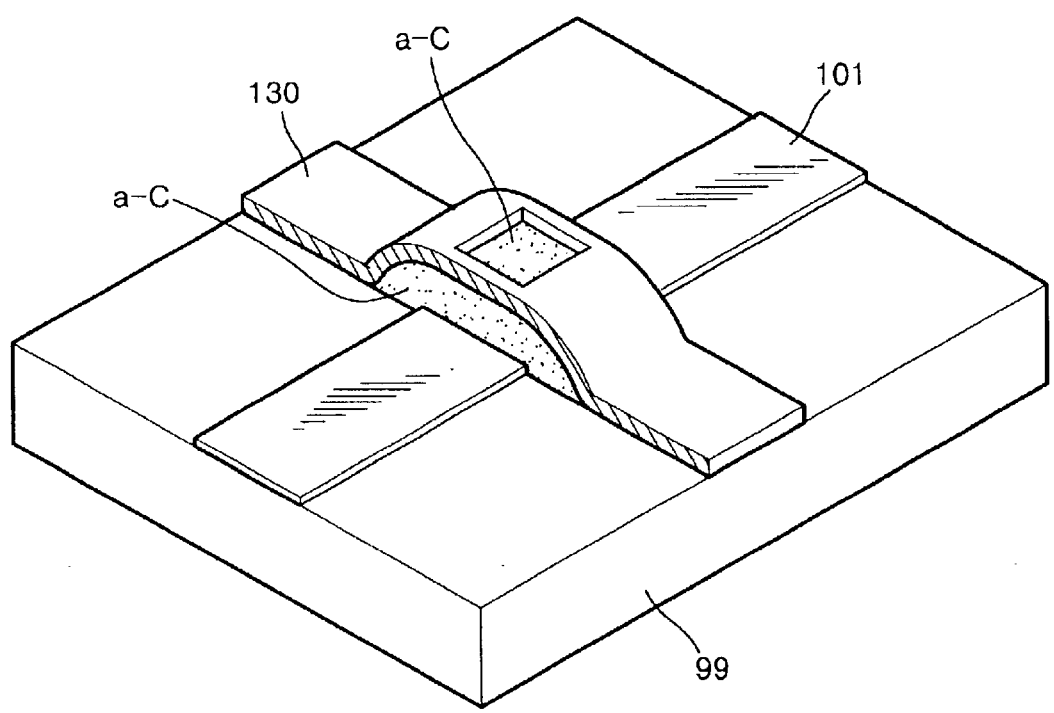

As shown in FIG. 10F, the amorphous silicon 130 and the gate electrode are patterned by photolithography. Then, the a-C below the amorphous silicon 130 is removed by an etch-back process using, for example, a calcination apparatus or a hydrogen or oxygen plasma.

After the above processes, if a catalytic layer for formation of CNTs is formed on top of the cathode 101 and CNTs are grown, an FED having the structure shown in FIGS. 9A and 9B is obtained. Here, if the depth of etch-back is appropriately controlled during the etch-back process of FIG. 10E so that the catalytic layer 120 used for generating the a-C remains, it is not necessary to separately form the catalytic layer for formation of the CNTs.

Hereinafter, a method of manufacturing an FED employing a double gate structure or a focusing electrode to accomplish more efficient electron emission will be described.

Figure 11A:
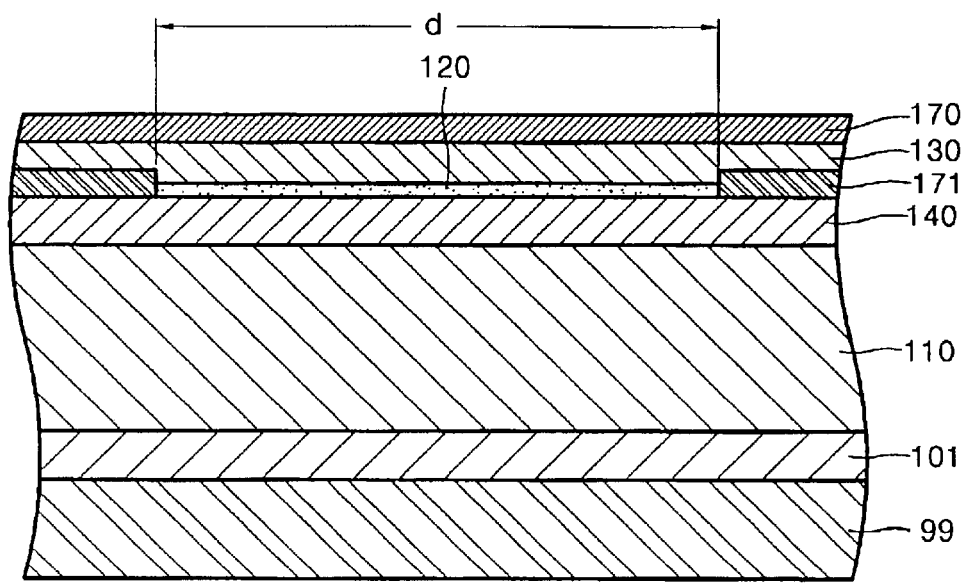
FIGS. 11A through 11H are sectional views of the stages of the process of manufacturing an FED having a double gate electrode according to the present invention.

As shown in FIG. 11A, through predetermined processes, for example, the processes described above, a cathode 101, a gate insulation layer 110, and a gate electrode 140 are formed on a substrate 99. An insulation layer, for example, a silicon oxide layer 171, having an opening portion of a predetermined diameter "d" is formed on the gate electrode 140. Then, a catalytic layer 120 for the generation of a-C is formed on the bottom of the opening portion. Next, an amorphous material, for example, amorphous silicon 130, and a second gate electrode or focusing electrode 170 are formed on the entire surface of the substrate 99. This stack structure may be formed by a typical method.

Figure 11B:
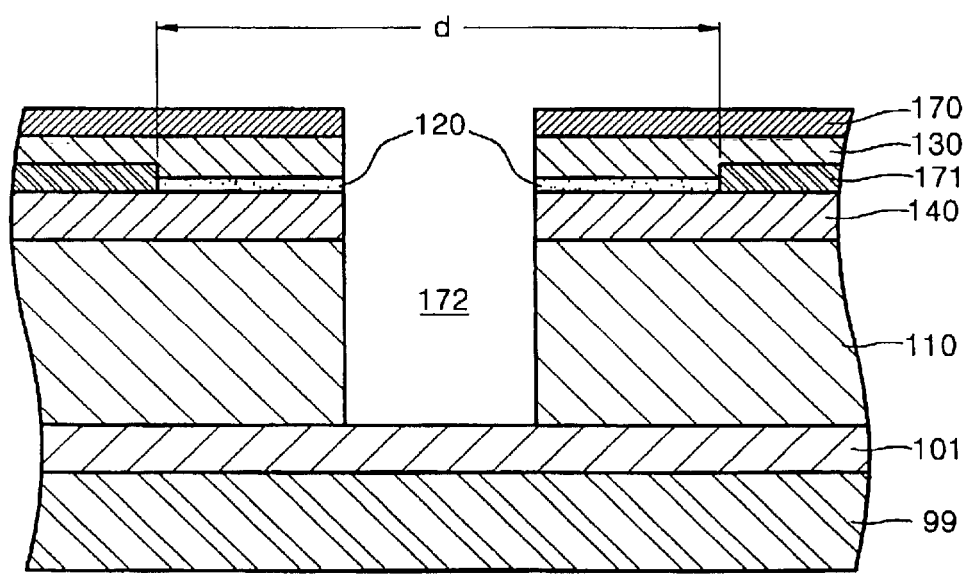

As shown in FIG. 11B, a well 172 is vertically formed in the stack structure of FIG. 11A. The well 172 is positioned at the center of the opening portion of the silicon oxide layer 171 and exposes the cathode 101 at the bottom of the well 172.

Figure 11C:
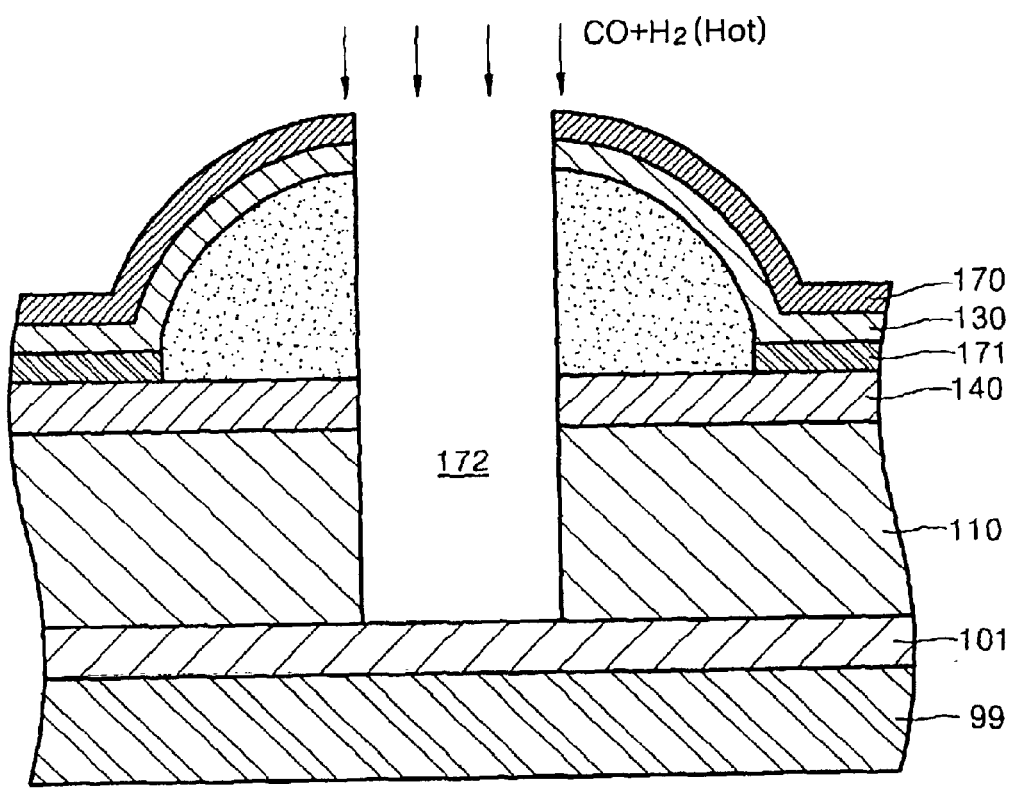

As shown in FIG. 11C, $CO+H_2$ gas is supplied into the well 172 in a CVD apparatus, and the catalytic layer 120 reacts to the $CO+H_2$ gas. As a result, a-C is generated and accumulated below the amorphous silicon 130, and the layers stacked on the catalytic layer 120 are transformed into a dome shape.

Figure 11D:
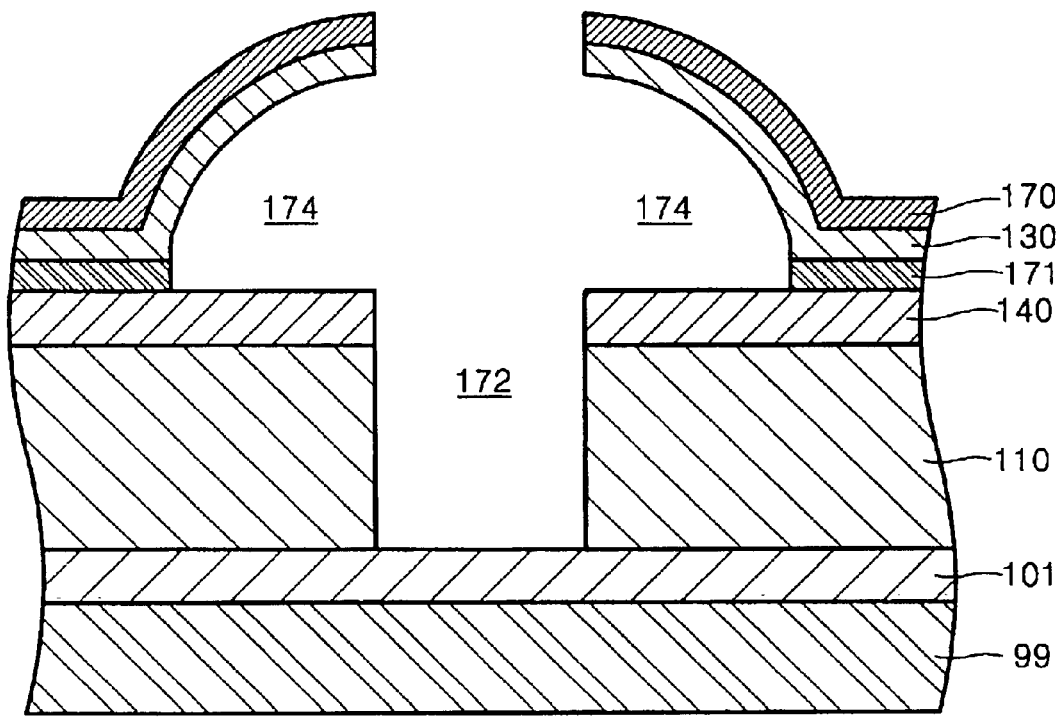

As shown in FIG. 11D, the a-C is removed by an etch-back process as described above to form a dome-shaped cavity 174 below the amorphous silicon 130.

Figure 11E:
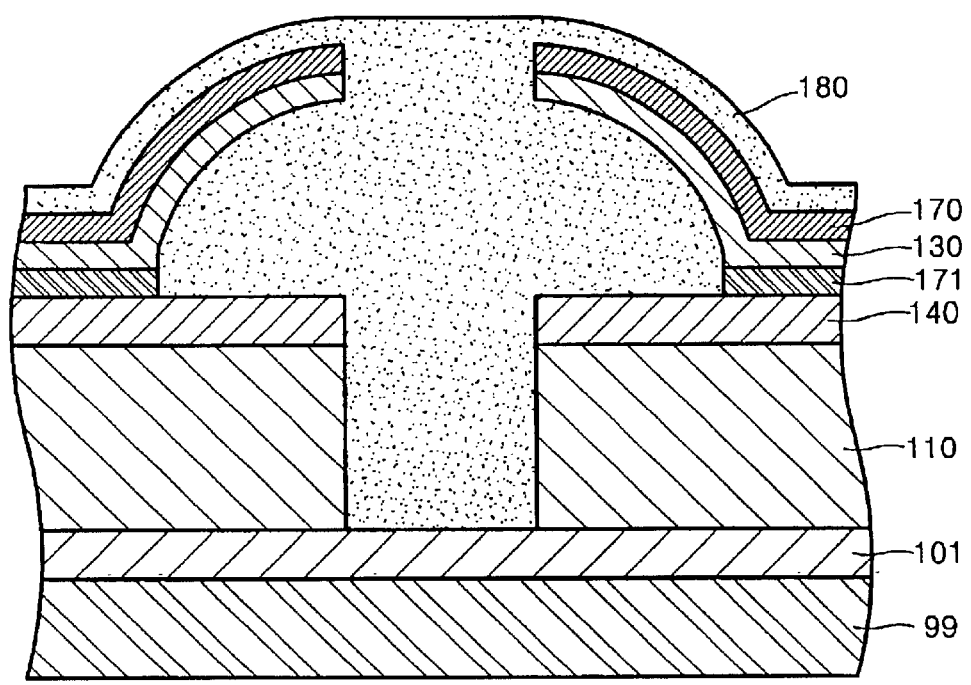

As shown in FIG. 11E, a photoresist is supplied from above the stack structure of FIG. 11D to fill the well 172 and the dome-shaped cavity 174 and to form a sacrificial layer 180 for a lift-off on the second gate electrode 170 positioned at the top of the stack structure of FIG. 11D.

Figure 11F:
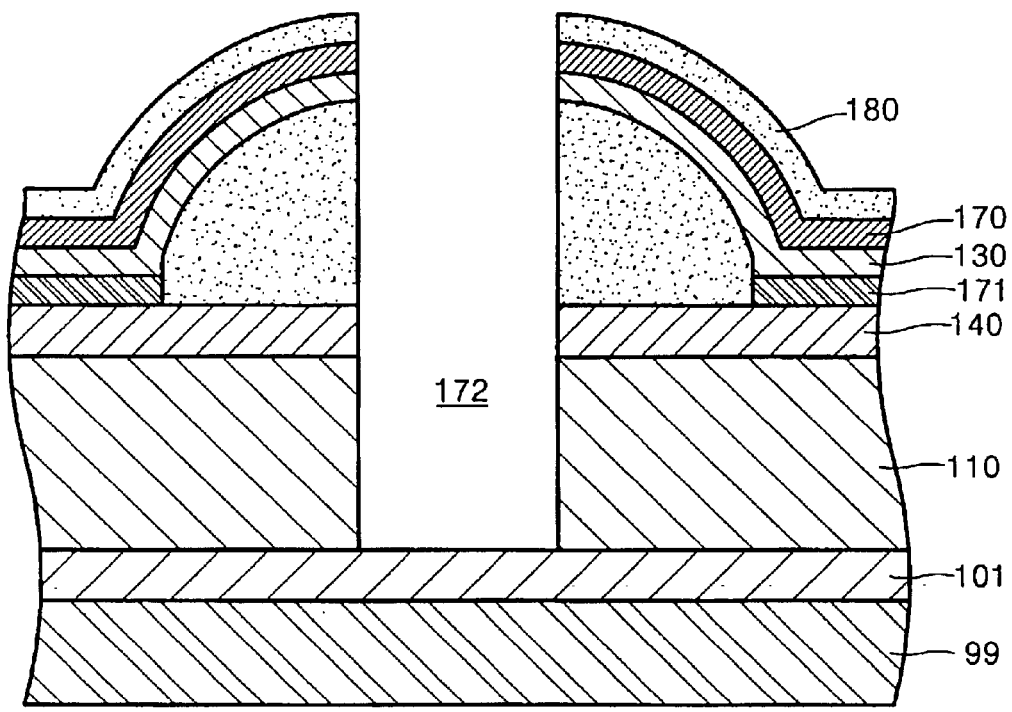

As shown in FIG. 11F, the photoresist within the well 172 is removed by a photolithographic process and an etching process. Here, the photoresist within the dome-shaped cavity 174 is not removed.

Figure 11G:
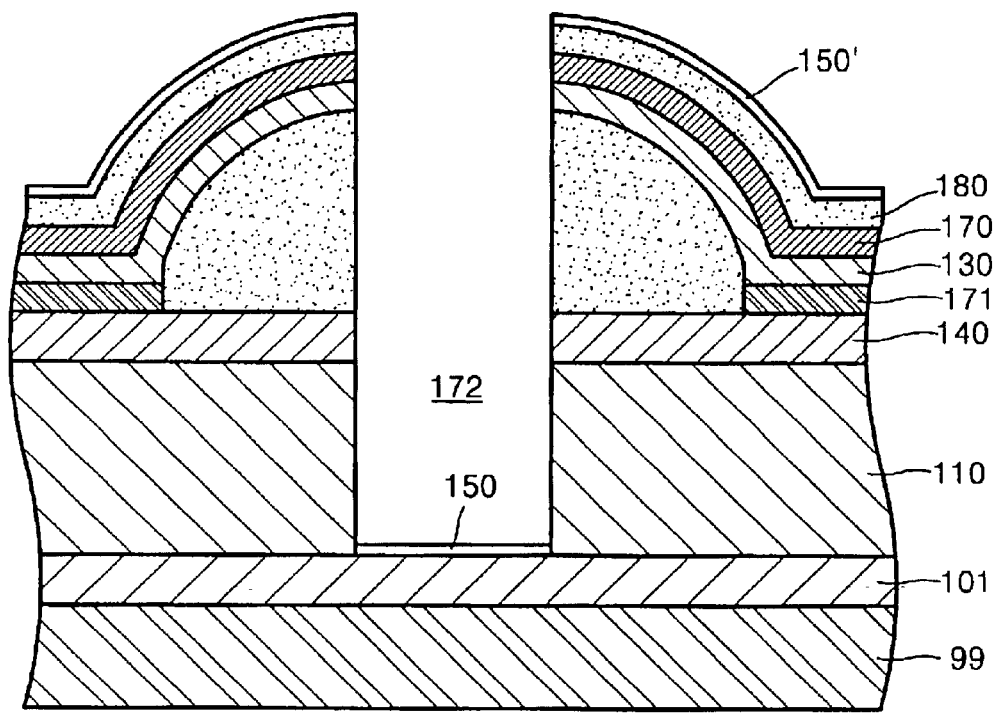

As shown in FIG. 11G, a catalytic layer 150 for the formation of CNTs is formed on the bottom of the well 172, which is also the top of the cathode 101. A catalytic material 150' is formed on the sacrificial layer 180 on the second gate electrode 170.

Figure 11H:
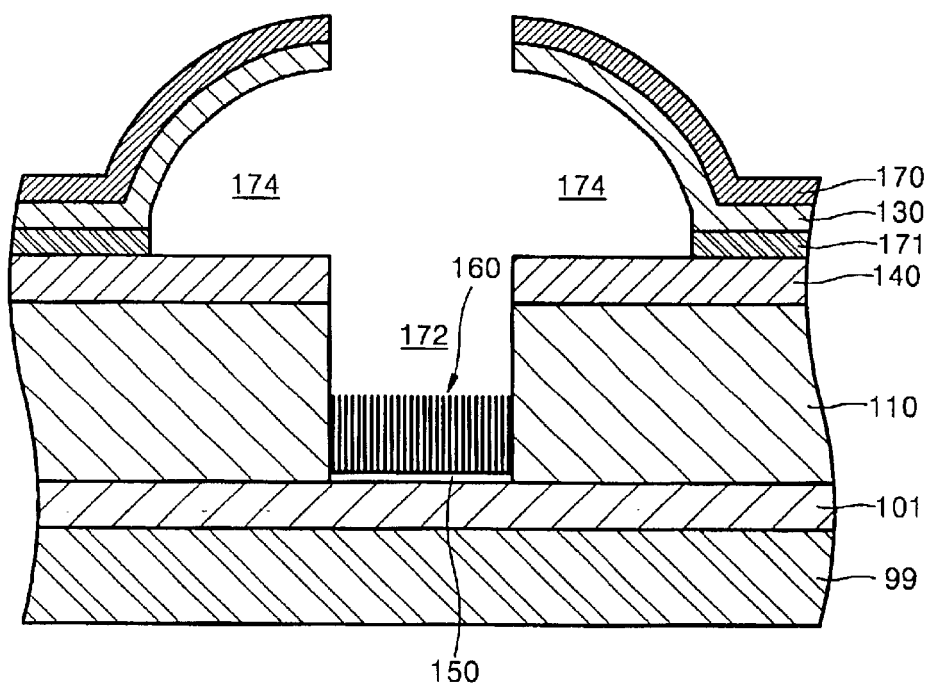

As shown in FIG. 11H, CNTs 160 are grown on the catalytic layer 150 on the bottom of the well 172 by a PECDV method, thereby completing a tetrode FED having a desired double gate or focusing electrode.

As described above, unlike conventional methods, which form an object layer for the generation of a structure to have a desired shape at an initial stage, the present invention employs a technique of allowing a layer or layers simply to be deposited so as to transform into a desired shape by the generation and expansion of a byproduct from an underlying layer. According to this technique, an object portion in a stack structure is transformed by a byproduct generated with an aid of a catalytic layer, thereby forming a floating structure lifting up from a substrate.

A triode structure having a potential difference between a gate electrode and a cathode, which are on the same plane, can be manufactured more easily according to the present invention than according to conventional methods. In the present invention, a-Si, which is used for an expanding layer, can also be used for a resist layer. According to circumstances, electrical elements, for example, a cathode and a gate electrode, are insulated from each other by a vacuum space without using an insulation layer, thereby increasing electron emission characteristics. In manufacturing an FED employing a double gate structure according to the present invention, self-alignment characteristics are used, accomplishing uniformity and allowing easy manufacturing. Since CVD allows a selective CNT growth characteristic to be used, the structure and characteristics of the FED can be effectively controlled by controlling the thickness of a layer or growth conditions during a deposition or etching process. In addition, according to the present invention, unlike conventional methods, a structure can be selectively manufactured per hole or manufactured to cover an area having pixel units so that many conventional manufacturing processes can be eliminated. The present invention does not have a limitation in the shape or size of an opening portion, and various structures can be formed by controlling the shape or size of an opening portion. Moreover, the space, height, or depth of a structure can be controlled by controlling the thickness of a catalytic layer or the conditions of CVD. The present invention can be applied to the manufacturing of a new structure, such as an MEMS, by applying a structure spatially formed according to the present invention to a variety of semiconductor manufacturing techniques While preferred embodiments of the present invention have been disclosed in the drawings and specification, they are used in the descriptive sense only and not for purpose of limitation. It will be understood that the present invention is not restricted to the structures and arrangements described in the above preferred embodiments and that various changes in form and details may be made therein by those skilled in the art.

What is claimed is:

1. A method of forming a predetermined stack structure, which is formed on a substrate, into a floating structure, the method comprising:

forming an expansion causer layer, which can generate a byproduct from the reacting with a predetermined reactant gas causing volume expansion, on the substrate;

forming an object material layer for the floating structure on a resultant stack;

forming a hole through which the reactant gas is supplied on a resultant stack;

supplying the reactant gas through the hole so that the object material layer partially lifts up from the substrate due to the byproduct generated from the reaction of the expansion causer layer with the reactant gas; and removing the byproduct through the hole so that the portion of the object material layer lifting up from the substrate can be completely separated from the substrate to form the floating structure.

2. The method of claim 1, wherein the expansion causer layer comprises a catalytic layer and an amorphous material contacting the catalytic layer.

3. The method of claim 2, wherein the catalytic layer is formed of a metal containing at least one element selected from the group consisting of Ni, Fe, and Co.

4. The method of claim 2, wherein the amorphous material is amorphous silicon.

5. The method of claim 1, wherein the step of removing the byproduct is performed by one of a calcination process and a sintering process using a gas plasma.

6. The method of claim 1, wherein the reactant gas is a mixture of carbon monoxide gas and hydrogen gas.

7. The method of claim 1, wherein the reactant gas is supplied by a chemical vapor deposition (CVD) method.

8. The method of claim 2, wherein the reactant gas is supplied by a chemical vapor deposition (CVD) method.

9. The method of claim 3, wherein the reactant gas is supplied by a chemical vapor deposition (CVD) method.

10. The method of claim 4, wherein the reactant gas is supplied by a chemical vapor deposition (CVD) method.

11. The method of claim 5, wherein the reactant gas is supplied by a chemical vapor deposition (CVD) method.

12. The method of claim 6, wherein the reactant gas is supplied by a chemical vapor deposition (CVD) method.

13. A method of forming a floating structure lifting up from a substrate, the method comprising:

forming a catalytic layer on the substrate;

forming an amorphous material on the catalytic layer, the amorphous material having an opening portion that partially exposes the catalytic layer;

supplying a reactant gas comprising hydrogen gas and carbon oxide gas through the opening portion so that amorphous carbon can be generated and accumulated between the amorphous material and the catalytic layer around the opening portion to form a predetermined carbon layer and force the amorphous material to lift up from the substrate; and removing the carbon layer through the opening portion so that the amorphous material around the opening portion is partially separated from and floats over the substrate.

14. The method of claim 13, wherein the amorphous material is amorphous silicon.

15. The method of claim 13, wherein the catalytic layer is formed of a metal containing at least one element selected from the group consisting of Ni, Fe, and Co.

16. The method of claim 13, wherein the step of removing the carbon layer is performed by one of a calcination process and a sintering process using a gas plasma.

17. The method of claim 13, wherein the reactant gas is a mixture of carbon monoxide gas and hydrogen gas.

18. The method of claim 13, wherein the reactant gas is supplied by a chemical vapor deposition (CVD) method.

19. The method of claim 14, wherein the reactant gas is supplied by a chemical vapor deposition (CVD) method.

20. The method of claim 15, wherein the reactant gas is supplied by a chemical vapor deposition (CVD) method.

21. The method of claim 16, wherein the reactant gas is supplied by a chemical vapor deposition (CVD) method.

22. The method of claim 17, wherein the reactant gas is supplied by a chemical vapor deposition (CVD) method.

23. A method of manufacturing a gate electrode having a floating structure lifting up from a substrate in a field emission device, the method comprising:

forming a cathode on the substrate;

forming a catalytic metal layer on the top of the cathode;

forming an amorphous material layer having a predetermined thickness on a resultant stack;

forming a gate electrode on the top of the amorphous material layer;

vertically forming a hole in a resultant stack to partially expose the surface of one of the catalytic metal layer and the cathode;

supplying a reactant gas comprising hydrogen gas and carbon oxide gas through the hole so that a carbon layer is grown between the amorphous material layer and its underlying stack around the hole and forces the amorphous material layer to lift up from the substrate; and removing the carbon layer through the hole so that the amorphous material layer and the gate electrode around the hole are partially separated from and float over the substrate.

24. The method of claim 23, further comprising the step of forming an insulation layer on the cathode to a predetermined thickness before the step of forming the catalytic metal layer, the insulation layer comprising an opening portion which corresponds to the hole, and more preferably, is coaxial with the hole.

25. The method of claim 23, wherein the catalytic metal layer is formed of a metal containing at least one element selected from the group consisting of Ni, Fe, and Co.

26. The method of claim 23, wherein the amorphous material layer is formed of amorphous silicon.

27. The method of claim 23, wherein the step of removing the carbon layer is performed by one of a calcination process and a sintering process using a gas plasma.

28. The method of claim 23, wherein the reactant gas is supplied by a chemical vapor deposition (CVD) method.

29. The method of claim 24, wherein the reactant gas is supplied by a chemical vapor deposition (CVD) method.

30. The method of claim 25, wherein the reactant gas is supplied by a chemical vapor deposition (CVD) method.

31. The method of claim 26, wherein the reactant gas is supplied by a chemical vapor deposition (CVD) method.

32. The method of claim 27, wherein the reactant gas is supplied by a chemical vapor deposition (CVD) method.

33. A method of manufacturing a gate electrode having a floating structure lifting up from a substrate in a field emission device, the method comprising the steps of:

forming a cathode on the substrate;

forming a gate insulation layer on the cathode to a predetermined thickness, forming a gate electrode on the gate insulation layer;

forming an upper insulation layer having an opening portion on the gate electrode to a predetermined thickness;

forming a catalytic layer on the top of the gate electrode exposed at the bottom of the opening portion of the upper insulation layer;

forming an amorphous material layer on a resultant stack to a predetermined thickness;

forming a second gate electrode on the amorphous material layer;

forming a hole corresponding to the opening portion from the top of the second gage electrode to directly below exposing the surface of either the catalytic layer or the cathode;

supplying a reactant gas comprising hydrogen gas and carbon oxide gas through the hole while heating the substrate so that a carbon layer is grown between the amorphous material layer and its underlying stack surrounding the hole and forces the amorphous material layer to lift up from the substrate; and removing the carbon layer through the hole so that the amorphous material layer and the second gate electrode around the hole are partially separated from and float over the substrate.

34. The method of claim 33, wherein the catalytic metal layer is formed of a metal containing at least one element selected from the group consisting of Ni, Fe, and Co.

35. The method of claim 33, wherein the amorphous material layer is formed of amorphous silicon.

36. The method of claim 33, wherein the step of removing the carbon layer is performed by one of a calcination process and a sintering process using a gas plasma.

37. The method of claim 33, wherein the reactant gas is supplied by a chemical vapor deposition (CVD) method.

38. The method of claim 34, wherein the reactant gas is supplied by a chemical vapor deposition (CVD) method.

39. The method of claim 35, wherein the reactant gas is supplied by a chemical vapor deposition (CVD) method.

40. The method of claim 36, wherein the reactant gas is supplied by a chemical vapor deposition (CVD) method.

41. A method of manufacturing a field emission device including a gate electrode having a floating structure, the method comprising:

forming a cathode on a substrate;

forming a gate insulation layer on the cathode to a predetermined thickness;

forming a gate electrode on the gate insulation layer;

forming an upper insulation layer having an opening portion on the gate electrode to a predetermined thickness;

forming a catalytic layer on the top of the gate electrode exposed at the bottom of the opening portion of the upper gate insulation layer;

forming an amorphous material layer on a resultant stack to a predetermined thickness;

forming a second gate electrode on the amorphous material layer;

forming a hole corresponding to the opening portion from the top of the second gage electrode to directly below exposing the surface of either the catalytic layer or the cathode;

supplying a reactant gas comprising hydrogen gas and carbon oxide gas through the hole while heating the substrate so that a carbon layer is grown between the amorphous material layer and its underlying stack surrounding the hole and forces the amorphous material layer to lift up from the substrate;

removing the carbon layer through the hole so that the amorphous material layer and the second gate electrode around the hole are partially separated from and float over the substrate;

supplying a photoresist into the hole and on the second gate electrode to fill the hole with the photoresist and form a photoresist film on the second gate electrode to a predetermined thickness;

removing the photoresist from the hole;

growing a catalytic material on the top of the cathode exposed at the bottom of the hole to form a catalytic layer for growing carbon nano tubes (CNTs);

depositing a CNT component material on the entire surface of a resultant stack to form a CNT array on the catalytic layer at the bottom of the hole; and removing the photoresist from a portion surrounding the hole in a resultant stack and from the second gate electrode so that unnecessary components including the catalytic material are removed.

42. The method of claim 41, wherein the catalytic metal layer is formed of a metal containing at least one element selected from the group consisting of Ni, Fe, and Co.

43. The method of claim 41, wherein the amorphous material layer is formed of amorphous silicon.

44. The method of claim 41, wherein the step of removing the carbon layer is performed by one of a calcination process and a sintering process using a gas plasma.

45. The method of claim 41, wherein the reactant gas is supplied by a chemical vapor deposition (CVD) method.

46. The method of claim 42, wherein the reactant gas is supplied by a chemical vapor deposition (CVD) method.

47. The method of claim 43, wherein the reactant gas is supplied by a chemical vapor deposition (CVD) method.

48. The method of claim 44, wherein the reactant gas is supplied by a chemical vapor deposition (CVD) method.

* * * * *